US006656637B2

(12) United States Patent
Yoon et al.

(10) Patent No.: US 6,656,637 B2
(45) Date of Patent: *Dec. 2, 2003

(54) CARBON-BASED ACTIVE MATERIAL FOR RECHARGEABLE LITHIUM BATTERY AND METHOD OF PREPARING CARBON-BASED ACTIVE MATERIAL

(75) Inventors: Sang-Young Yoon, Chungcheongnam-do (KR); Mishima Ryoji, Yokohamasi (JP); Tsuno Toshiaki, Kawasakisi (JP); Matsubara Keiko, Yokohamasi (JP)

(73) Assignee: Samsung SDI Co., Ltd., Kyungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/478,857

(22) Filed: Jan. 7, 2000

(65) Prior Publication Data

US 2003/0143463 A1 Jul. 31, 2003

(30) Foreign Application Priority Data

Jan. 7, 1999 (JP) .......................... 11-002364

(51) Int. Cl.$^7$ ................................. H01M 4/58
(52) U.S. Cl. .................. 429/231.4; 429/209; 429/213; 429/231.9; 429/231.95
(58) Field of Search ................ 429/209, 213, 429/231.4, 231.9, 231.95

(56) References Cited

U.S. PATENT DOCUMENTS

| 5,116,592 A | * | 5/1992 | Weinberg | .................. 204/294 |
| 5,443,930 A | * | 8/1995 | Shoji et al. | ................. 429/224 |
| 5,871,864 A | * | 2/1999 | Kobayashi et al. | ......... 429/218 |

* cited by examiner

Primary Examiner—Carol Chaney
Assistant Examiner—Dah-Wei D. Yuan
(74) Attorney, Agent, or Firm—Blakely, Sokoloff, Taylor & Zafman

(57) ABSTRACT

Disclosed is a carbon-based active material for a rechargeable lithium battery that is capable of increasing charge and discharge efficiency of the battery.

The carbon-based active material has no hydroxyl groups on a surface by heat-treating under a fluorine atmosphere.

2 Claims, 8 Drawing Sheets

Wave number (cm$^{-1}$)

CARBON-BASED ACTIVE MATERIAL FOR RECHARGEABLE LITHIUM BATTERY AND METHOD OF PREPARING CARBON-BASED ACTIVE MATERIAL

CROSS REFERENCE TO RELATED APPLICATION

This application is based on application No. Hei. 11-2364 filed in the Japanese Patent Office on Jan. 7, 1999, the content of which is incorporated hereinto by reference.

BACKGROUND OF THE INVENTION (a) Field of the Invention

The present invention relates to a carbon-based active material for a rechargeable lithium battery, the rechargeable lithium battery and a method of preparing the carbon-based active material.

(b) Description of the Related Art

In recent years, the development of miniaturized portable electronics provokes needs for a rechargeable battery having a high capacity as well as a light weight. From the viewpoint of the capacity improvement per unit weight, the rechargeable lithium battery is preferably adopted because lithium has a high standard potential as well as a low electrochemical equivalent weight.

Metallic lithium has been used for the negative active material in a rechargeable lithium battery. However, during charging, lithium is electroplated onto the metallic lithium electrode, it deposits to form a dendric layer that increases the reactivity of lithium.

The problem of lithium has been addressed by replacing the lithium metal with carbon-based materials. Owing to the use of the carbon-based materials, the potential safety problem present in metallic lithium-based batteries can be prevented while achieving a relatively higher energy density as well as the reasonable shelf life.

Among carbon-based material, graphite-based material has a high charge and discharge efficiency and voltage flatness. Graphite-based material is produced by heat-treating petroleum pitch or polymer resin at 2,000 to 3,000° C. The resulting graphite-based material has hydroxyl groups on its surface, which react with an electrolyte during charge and cause decreases in a charge and discharge efficiency.

SUMMARY OF THE INVENTION

It is an object of the present invention to provide a carbon-based active material for a rechargeable lithium battery, which can increase charge and discharge efficiency.

It is another object to provide a rechargeable lithium battery having high charge and discharge efficiency.

It is still another object to provide a method of preparing the carbon-based active material.

These and other objects may be achieved by a carbon-based active material for a rechargeable lithium battery produced by heat-treating a carbon-based material under a fluorine atmosphere. The fluorine atmosphere serves to remove hydroxyl groups on the surface without the generation of C—F covalent bonds. Accordingly, the carbon-based active material of the present invention has no hydroxyl groups or C—F covalent bonds on the surface.

In order to achieve these and other objects and others, the present invention provides a rechargeable lithium battery including a positive active material and a negative carbon-based active material. The carbon-based active material has no hydroxyl groups and C—F covalent bonds and produced by heat-treating a carbon-based material under a fluorine atmosphere. The positive active material is a material into or from which lithium ions are reversibly intercalated or deintercalated. The carbon-based active material is a material into or from which lithium ions are intercalated or deintercalated.

The present invention further includes a method of preparing a carbon-based active material for a rechargeable lithium battery. In the method, a carbon-based material is heat-treated under a fluorine atmosphere to remove hydroxyl group from a surface thereof without the generation of C—F bond. The heat-treating step preferably includes the steps of injecting the carbon-based material into a reactor, and heating the reactor by the suitable temperature under vacuum. Next, gaseous fluorine is charged into the reactor and the carbon-based material is heat-treated for a suitable time. The gaseous fluorine preferably includes fluorine gas of at least 99.7% purity. The pressure of the gaseous fluorine is preferably 10 to 100 kPa. The second heat-treating step is preferably performed at 80 to 150° C. for 15 to 30 minutes.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
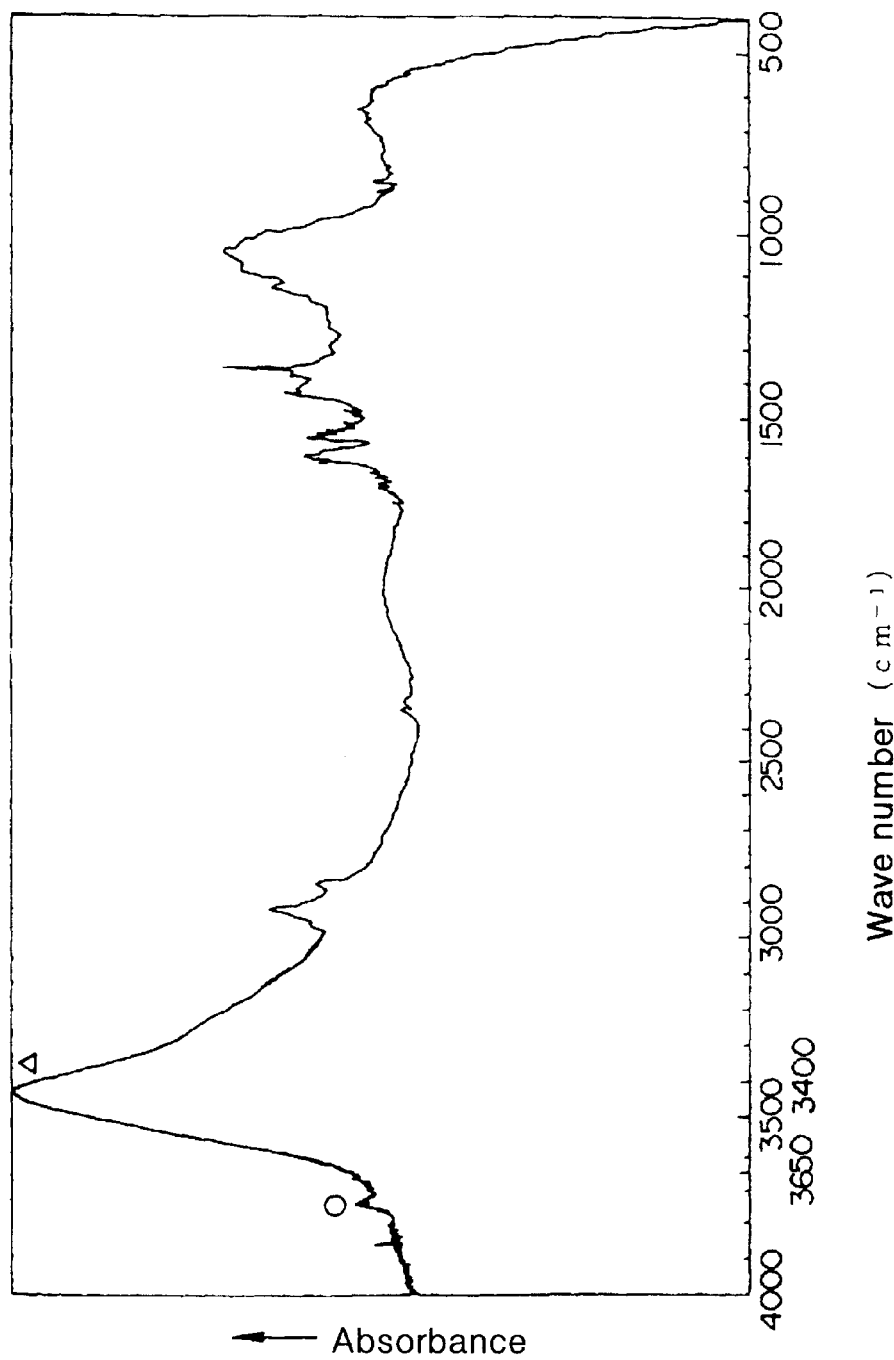
FIG. 1 is a graph showing an infrared spectrum of a surface of carbon-based material Sample No. 1.

The carbon-based active material of the present invention has no hydroxyl groups on its surface. The carbon-based active material is prepared by heat-treating a carbon-based material under a fluorine atmosphere. The fluorine atmosphere serves to remove hydroxyl groups on the surface without the generation of C—F covalent bonds. In addition, the carbon-based active material has no C—F covalent bond on its surface. It is preferred that no absorption peaks due to hydroxyl groups and C—F covalent bonds occur in infrared spectrum.

The carbon-based material may include graphite or amorphous carbon. The graphite may include natural graphite or artificial graphite. The amorphous carbon may include cokes. Natural graphite, artificial graphite or cokes have a layered structure into or from which lithium ion can be intercalated or deintercalated. As the carbon-based material, graphite or amorphous carbon as well as materials prepared by sintering fibrous carbon, amorphous carbon, plant matter, or synthetic polymer such as phenol resin, are used.

The carbon-based active material of the present invention has no hydroxyl groups which react with an electrolyte and decompose during charge, particularly during the first charge cycle such that the carbon-based active material can prevent the decreases in the efficiency of a battery due to the decomposition of the electrolyte. In addition, the carbon-based active material has no C—F covalent bonds that decrease the discharge capacity per unit weight of the carbon-based material.

The fluorine atmosphere also results in the scatter of the surface of the carbon-based material and increases sites into which lithium ion is intercalated. Accordingly, the carbon-based active material of the present invention can increase discharge capacity.

The rechargeable lithium battery of the present invention includes the negative carbon-based active material and a positive active material into or from which lithium ions are intercalated or deintercalated. The battery further includes a separator and an organic electrolyte.

The positive active material may include $LiCoO_2$, $LiMn_2O_4$, $LiMnO_2$, $LiNiO_2$, $LiFeO_2$, $TiS_2$, $FeS_2$, $Nb_3S_4$, $V_2O_5$, $V_3O$, $Cr_2O_3$, $Cr_3O_8$, FeOCl or $FeVO_4$. Preferably, the positive active material has an oxidation-reduction potential of at least 2.5V compared to lithium so as to increase the voltage of the rechargeable lithium battery.

An solvent for the organic electrolyte may include propylene carbonate, ethylene carbonate, butylene carbonate, benzonitrile, acetonitrile, tetrahydrofuran, 2-methyltetrahydrofuran, γ-butyrolacton, dioxolane, dimethylformamide, dimethylacetoamide, dimethylsulfoxide, dioxane, dimethoxyethane, sulforane, dichloroethane, chlorobenzene, nitrobenzene, dimethylcarbonate, methylethyl carbonate, diethyl carboante, methylpropyl carboante, methylisopropyl carbonate, ethylbutyl carbonate, dipropyl carbonate, diisopropyl carbonate, dibutyl carbonate or a mixture thereof.

An solute for the organic electrolyte may include $LiPF_6$, $LiBF_4$, $LiSbF_6$, $LiAsF_6$, $LiClO_4$, $LiCF_3SO_3$, $Li(CF_3SO_2)N$ or $LiC_4F_9SO_3$.

Alternatively, instead of the organic electrolyte solution, a solid polymer electrolyte may be used. It is preferable to use a polymer having high Li ion-conductivity. Polyethylene oxide, polypropylene oxide or polyethylene imide may be used. In addition, a gel phase electrolyte may be used. The gel phase electrolyte is produced by adding the organic electrolyte solution to the polymer.

The rechargeable lithium battery of the present invention includes positive and negative electrodes. The positive or negative electrode is prepared by adding a polyvinylidenefluoride binder to the positive or negative active material to make a slurry and applying the slurry on a collector, such as metal foil or net. Between the positive and negative electrodes, a separator is interposed and the positive and negative electrodes and the separator are wound. The wound positive and negative electrodes and the separator refer to an electrode assembly. The electrode assembly is inserted into a battery case and an electrolyte is then added to the case. The case may have cylindrical or square shape.

Alternatively, the positive and negative slurry is pressed to make pellets with a separator interposed between the pellets. The pellets and separator are referred to as the electrode assembly. The electrode assembly is inserted into a coin-type case and an electrolyte is then added to the case. Furthermore, a sheet-type battery may also be produced.

The carbon-based active material is prepared by heat-treating a carbon-based material under a fluorine atmosphere. The fluorine atmosphere has good effect on the removal of hydroxyl groups from the surface of the carbon-based active material, but has bad effect on the generation of surface C—F covalent bonds. Accordingly, it is important to control the heat-treating time sufficient to completely remove the hydroxyl group and to generate no C—F covalent bonds on the surface.

In the present invention, the heat-treating step is preferably performed by injecting the carbon-based material into a reactor, reducing the pressure of the reactor to a vacuum and heating the reactor at a suitable temperature. Thereafter, gaseous fluorine is charged into the reactor and the carbon-based material is again heat-treated in the reactor for a suitable time. The heat-treating step is performed until functional groups on the surface are removed and no fluorination (i.e., the generation of C—F covalent bonds) occurs on the surface.

The carbon-based material may include graphite or amorphous carbon. The graphite may include natural graphite or artificial graphite. The amorphous carbon may include cokes. As the carbon-based material, natural graphite, artificial graphite, cokes, fibrous carbon, amorphous carbon, materials prepared by sintering plant matter or synthetic polymer such as phenol resin, are used. Preferably, artificial graphite is used. The artificial graphite is preferably prepared by sintering coal tar pitch at 2,000 to 3,000° C.

The shape of the carbon-based material may include powder, fiber or another type. The carbon-based material powder with an extremely large average diameter is not desirable for a negative active material. Preferably, the average diameter of the carbon-based material powder is 10 to 30 μm.

The heat-treatment is performed under a fluorine atmosphere. The fluorine atmosphere is preferably obtained by charging gaseous fluorine of a high purity into a heating bath. The fluorine gas of at least 99.7% purity is more preferably used, and most preferably, the fluorine gas of at least 99.9% purity is used. When the fluorine gas having a purity of less than 99.7% is used in the heat-treating step, impurities may react with the surface of the carbon-based active material, which decrease charge and discharge efficiency of the rechargeable lithium battery.

The pressure of the fluorine atmosphere is preferably 10 to 100 kPa, more preferably, 20 to 50 kPa. If the pressure is less than 10 kPa, it is difficult to remove OH groups. Whereas the pressure is more than 100 kPa, C—F bonds easily occur.

The heat-treating is preferably performed at 80 to 150° C., more preferably, about 100° C. for 15 to 30 minutes. If the heat-treating temperature is less than 80° C., various functional groups are not completely removed from the surface of the carbon-based material. Whereas, the heat-treating temperature is more than 150° C., C—F covalent bonds occur on the surface of the carbon-based material. When the heat-treating step is performed at the more preferred temperature of about 100° C., discharge capacity and, charge and discharge efficiency increase.

If the heat-treating time is less than 15 minutes, various functional groups are not completely removed from the surface of the carbon-based material. Whereas, the time is more than 30 minutes, C—F covalent bond occur on the surface of the carbon-based material.

Various analysis that gives to structural information about materials can be used to check the presence of functional groups on the surface of the carbon-based active material. For example, X-ray photoelectron spectroscopy, secondary ion mass analysis or auger electron spectroscopy can be used. Preferably, infrared spectroscopic analysis can be used to easily and quickly check the presence of functional groups on the surface of the carbon-based active material.

The hydroxyl group generally has absorption wavenumbers (wavelength) of 3650 to 3584 $cm^{-1}$ (2.74 to 2.79 $\mu m$). Accordingly, the infrared spectrum in the region can be used to check the presence of hydroxyl group on the carbon-based active material. The hydroxyl group in the region is a "free" hydroxyl group which is not bonded with another hydroxyl group and different from a hydroxyl group which is bonded with another hydroxyl group by hydrogen bond (3550 to 3200 $cm^{-1}$ (2.82 to 3.13 $\mu m$)).

The C—F covalent bond generally has absorption wavenumber of 1100 to 1000 $cm^{-1}$. Accordingly, an infrared spectrum can be used for confirming the presence of C—F covalent bond on the carbon-based active material.

Because the carbon-based active material of the present invention has no surface hydroxyl group, the reaction of the carbon-based active material with an electrolyte can be prevented. Accordingly, the carbon-based active material of the present invention can increase charge and discharge efficiency during initial charging. Furthermore, as the carbon-based active material of the present invention also has no C—F covalent bond on the surface thereof, the carbon-based active material has a high discharge capacity per unit weight of the carbon-based active material.

Accordingly, the rechargeable lithium battery with the carbon-based active material of the present invention has high charge and discharge efficiency and discharge capacity.

The carbon-based active material without hydroxyl group does not react with an electrolyte. Accordingly, the carbon-based active material can prevent the generation of gas due to the reaction of the carbon-based active material with the electrolyte, and the increases in the internal pressure of the battery. Because the decomposed electrolyte does not adhered to the surface of the negative active material, cycle life characteristics of the rechargeable lithium battery can be greatly improved.

The following examples further illustrate the present invention.

EXAMPLE 1

Coal tar pitch was dissolved in a tetrahydrofuran solvent, and the insoluble components were removed and the residual component was sintered. Thereafter, the sintered residual component was carbonized and graphitized. As a result, synthetic graphite was obtained. The obtained synthetic graphite and natural graphite (with an average diameter of 15 $\mu m$) were used for a carbonaceous material.

The carbonaceous material was injected into a reactor made of nickel. The pressure of the reactor was reduced to $10^{-4}$ torr and the reactor was heated to 50–300° C. Next, fluorine gas of 99.7% purity was flowed into the reactor for 15 minutes to obtain a reactor pressure of 230 torr. The condition was maintained for 30 minutes in order to produce carbonaceous materials (Sample Nos. 1 to 8).

Each of the carbonaceous materials was mixed with a polyvinylidene fluoride binder and N-methylpyrrolidone to form a slurry. The slurry was coated on a copper foil and N-methylpyrrolidone was evaporated from the slurry on the copper foil. As a result, a disk-shaped carbonaceous electrode having the maximum diameter of 13 millimeters (mm) and thickness of 0.1 mm was obtained. At this time, the ratio of carbonaceous material to the binder was 90:10.

The carbonaceous electrode, a lithium electrode made of metallic lithium, and a separator made of a porous polypropylene film were used. The separator was interposed between the carbonaceous and the lithium electrodes. The positive and negative electrodes and separator were put into a coin-type case with an electrolyte to produce a half cell. The electrolyte included 1M $LiPF_6$ in a mixture (EC:DMC=1:1) of ethylene carbonate (EC) and dimethyl carbonate (DEC).

A charge and discharge test was performed under the condition of a charge current density of 0.4 $mA/cm^2$, a discharge terminal voltage of 0V, a discharge current density of 0.4 $mA/cm^2$ and a discharge terminal voltage 2V with respect to the half cells. The charge and discharge capacity of the first cycle was measured. In addition, the discharge capacity to charge capacity at the initial cycle (charge and discharge efficiency) was measured. The results and the associated heat-treating condition are presented in Table 1. Further, the carbonaceous material was dried under reduced pressure and an infrared spectroscopic analysis was performed with the respect to the surface of the carbonaceous material. The results are represented in FIGS. 1 to 8.

TABLE 1

| Sample No. | Raw material | Reaction temperature [° C.] | Charge capacity at a first cycle [mAh/g] | Discharge capacity at a first cycle [mAh/g] | Charge and discharge efficency |
|---|---|---|---|---|---|
| 1 | Artificial graphite | No heat-treatment | 352.21 | 303.27 | 86.1 |
| 2 | | 50° C. | 388.33 | 304.16 | 78.3 |
| 3 | | 100° C. | 343.03 | 314.16 | 91.5 |
| 4 | | 200° C. | 357.36 | 310.91 | 87.0 |
| 5 | | 300° C. | 349.75 | 305.08 | 87.2 |
| 6 | Natural graphite | No heat-treatment | 414.31 | 372.23 | 89.8 |
| 7 | | 100° C. | 434.00 | 381.00 | 87.8 |
| 8 | | 300° C. | 474.67 | 353.61 | 74.5 |

The carbonaceous material of Sample No. 1 was artificial graphite without heat-treatment. As shown in FIG. 1, the absorption peak expressed by "○" occurs at about 3600 $cm^{-1}$. The peak indicates a "free" hydroxyl group on the surface of the carbonaceous material. Further, a broad peak expressed by "Δ" is shown between 3400 to 3500 $cm^{-1}$ and it is considered that the peak is caused by hydroxyl group of water which can not be removed by drying.

The charge and discharge test result of the carbonaceous material is shown in Table 1.

Figure 2:
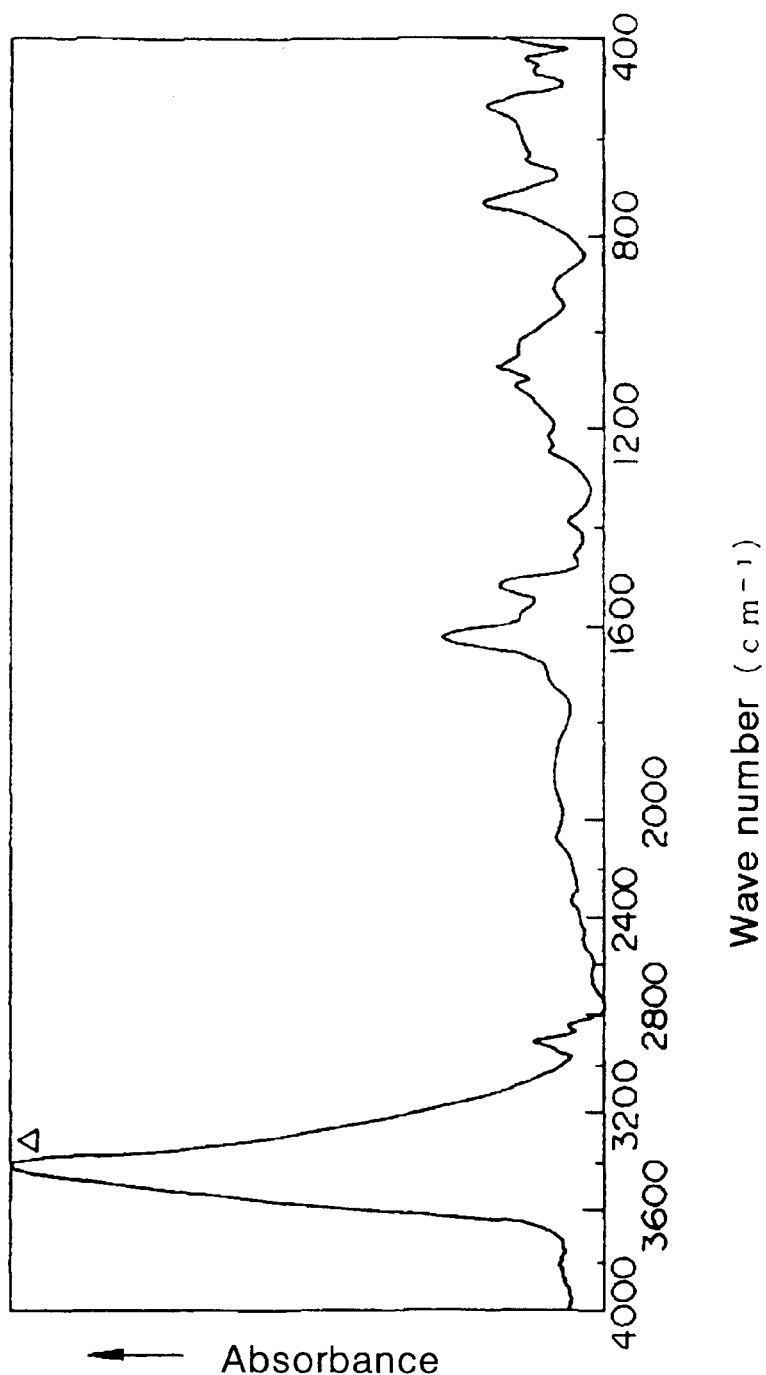
FIG. 2 is a graph showing an infrared spectrum of a surface of carbon-based material Sample No. 2.
Figure 3:
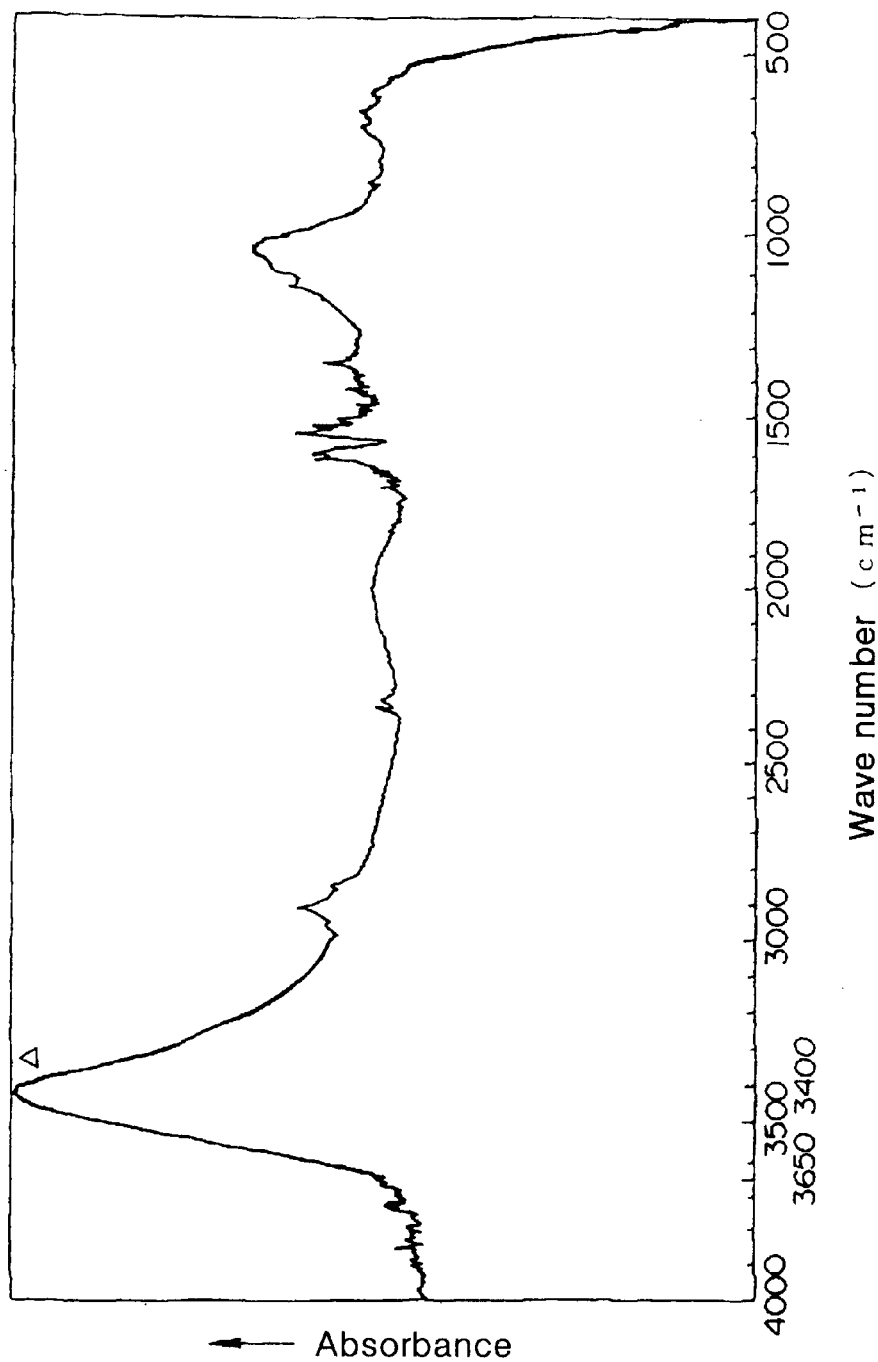
FIG. 3 is a graph showing an infrared spectrum of a surface of carbon-based material Sample No. 3.
Figure 4:
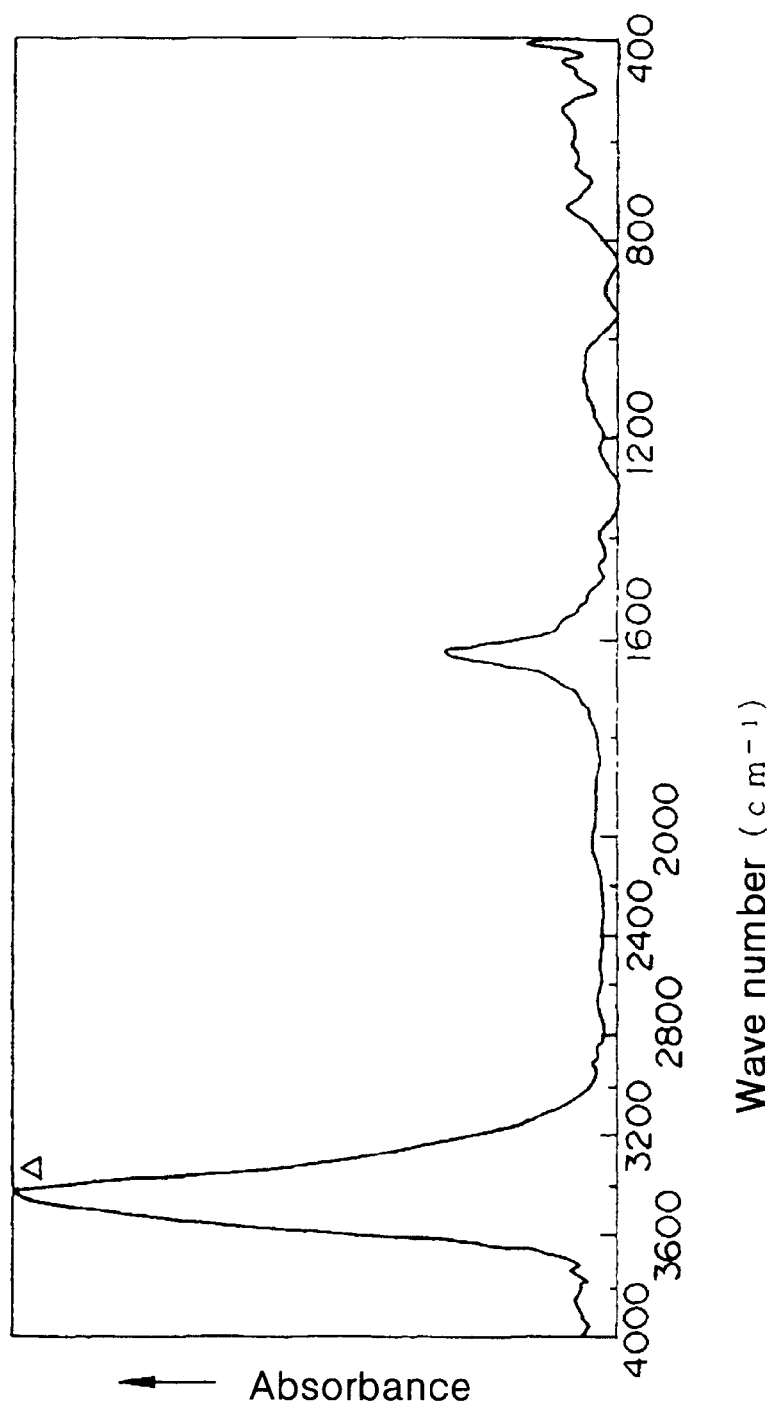
FIG. 4 is a graph showing an infrared spectrum of a surface of carbon-based material Sample No. 4.
Figure 5:
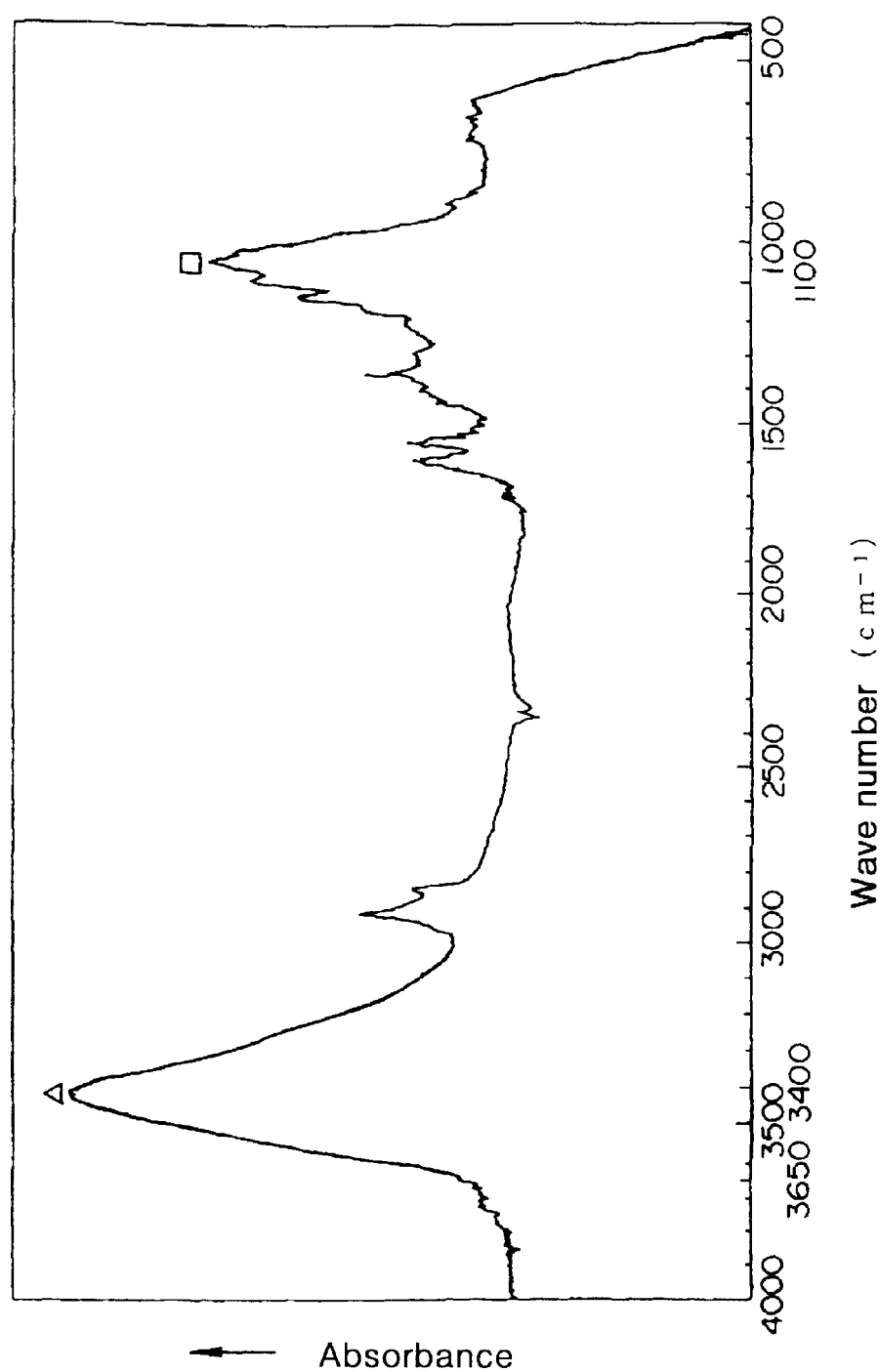
FIG. 5 is a graph showing an infrared spectrum of a surface of carbon-based material Sample No. 5.

The carbonaceous materials of Sample Nos. 2 to 5 were made by heat-treating Sample No. 1 at temperature ranging from 50 to 300° C. As shown in FIG. 2, no absorption peak due to a "free" hydroxyl group occur at about 3600 $cm^{-1}$ and the peak due to hydroxyl group of water, which are attached to the carbonaceous material, occurs at 3400 to 3500 $cm^{-1}$ and is expressed by Δ. The Sample No.5 has a peak due to C—F covalent bond expressed by □ at about 1100 $cm^{-1}$. It was found that the heat-treatment under a fluorine atmosphere serves to remove hydroxyl group on the surface of artificial graphite.

As shown in Table 1, Samples Nos. 2 to 5 have higher discharge capacities than Sample No.1. Additionally, Samples Nos. 3 to 5 have higher charge and discharge efficiency than Sample No.1. Sample No.3 (heat-treated at 100° C.) has a high discharge capacity of at least 314 mA/g as well as a high charge and discharge efficiency of at least 90%.

Figure 6:
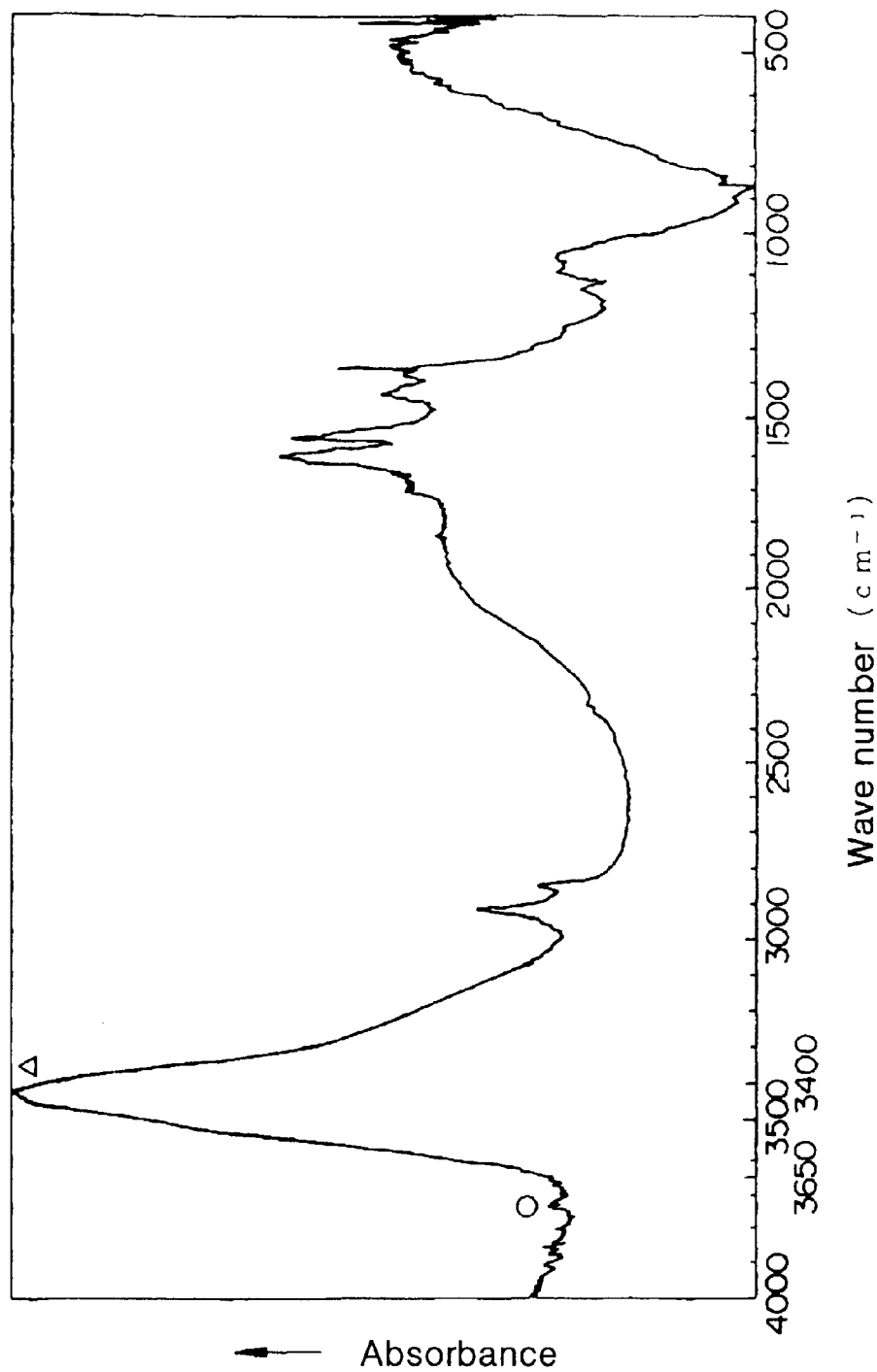
FIG. 6 is a graph showing an infrared spectrum of a surface of carbon-based material Sample No. 6.

The carbonaceous material of Sample No. 6 was natural graphite prepared without the heat-treatment. As shown in FIG. 6, the peak expressed by 0 occurs at 3600 cm$^{-1}$, which means that "free" hydroxyl group is remained on the surface of the carbon-based material. The peak due to hydroxyl group of water attached to the carbon-based material occurs at 3400 to 3500 cm$^{-1}$ and is expressed by Δ.

The charge and discharge test result of the electrode using the carbon-based active material is shown in Table 1.

Figure 7:
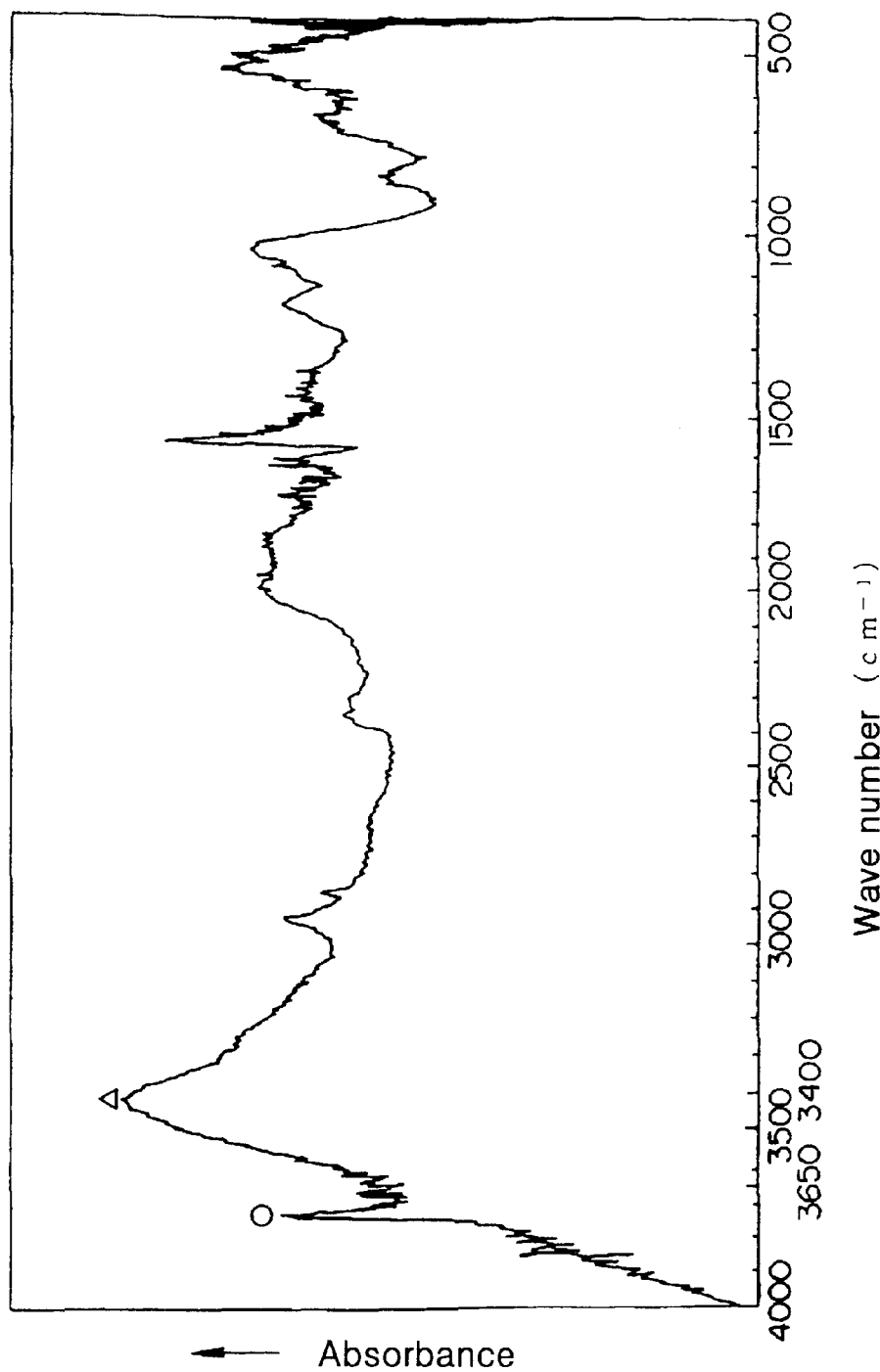
FIG. 7 is a graph showing an infrared spectrum of a surface of carbon-based material Sample No. 7.
Figure 8:
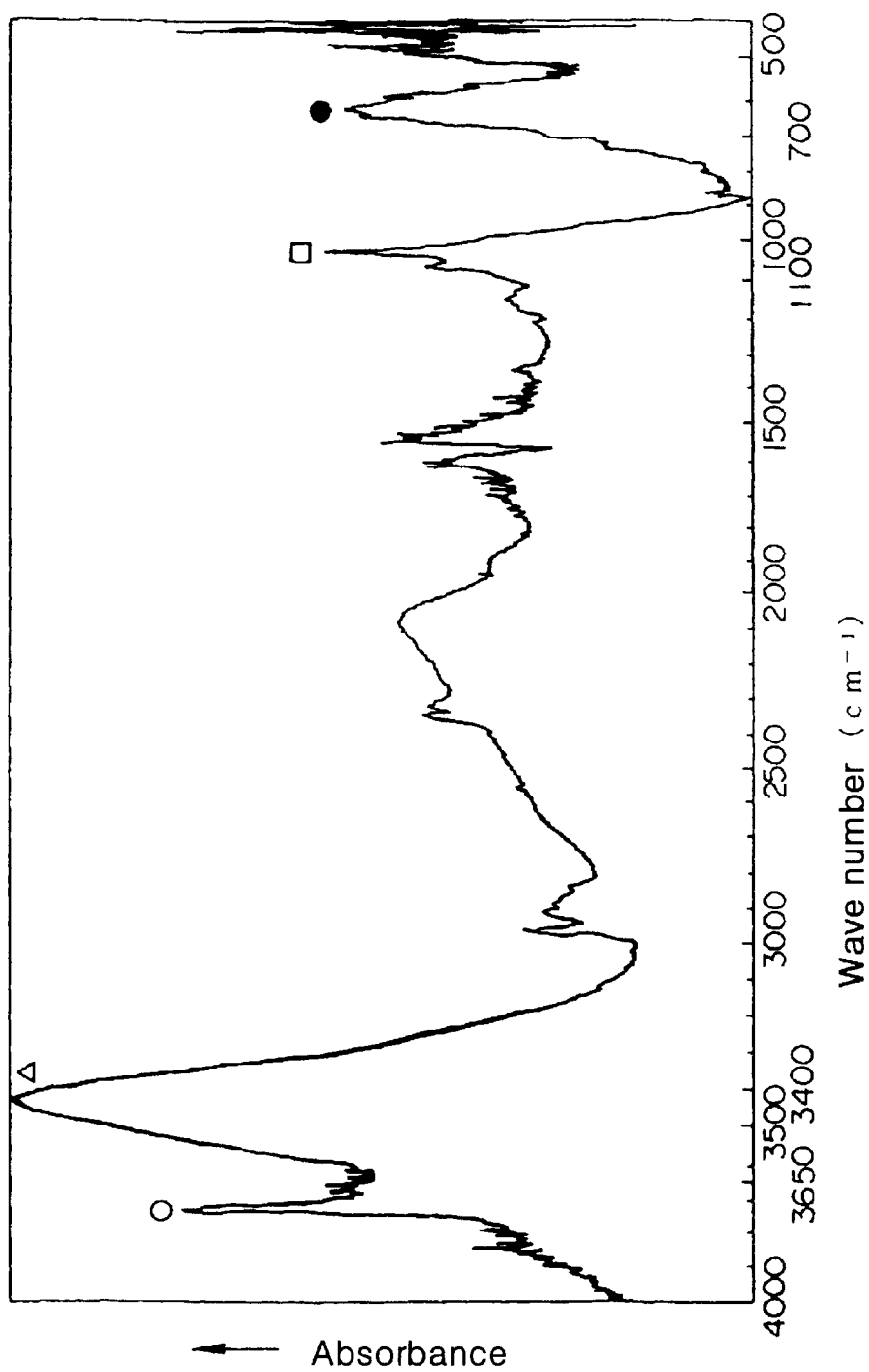
FIG. 8 is a graph showing an infrared spectrum of a surface of carbon-based material Sample No. 8.

Next, the carbon-based active materials of Sample Nos. 7 and 8 were made by heat-treating Sample No. 6 to 100 and 300° C., respectively. As shown in FIGS. 7 and 8 which are infrared spectrums of Sample Nos. 7 and 8, the broad peak of "free" hydroxyl groups occur at about 3600 cm$^{-1}$. In FIG. 8, a peak due to a C—F covalent bond occurs and expressed by □ at 1100 cm$^{-1}$ and a peak due to a $CF_2$ group or a $CF_3$ group also occurs and is expressed by ● at 700 cm$^{-1}$.

As shown in Table 1, the carbon-based active material of Sample No. 7 has larger discharge capacity than that of Sample No. 6, but has lower charge and discharge efficiency than that of Sample No. 6. The carbonaceous material of Sample No. 8 has lower discharge capacity and charge and discharge efficiency than that of Sample No. 6.

The results shown in Table 1 and in FIGS. 1 and 8 indicate that an increases in a charge and discharge efficiency by heat-treatment with fluorine is higher in artificial graphite rather than in natural graphite. Whereas the increases in a discharge capacity is higher in natural graphite rather than in artificial graphite.

As described above, the carbonaceous material of the present invention has no hydroxyl groups on the surface, preventing the reaction of the carbonaceous material with an electrolyte and increasing charge and discharge efficiency. The effective surface of the carbonaceous material is scattered by treating a surface thereof with a fluorine such that the number of sites into which lithium ions are intercalated and the charge and discharge capacity can be increased.

The rechargeable lithium battery of the present invention employs the carbonaceous material without hydroxyl groups on the surface and thus has good charge and discharge efficiency and discharge capacity.

The carbonaceous material has no hydroxyl group and does not react with an electrolyte, preventing gas generation caused by decomposing the electrolyte, and the increases in the internal pressure of the battery. As the decomposed electrolyte does not adhered to the surface of the carbonaceous material, the cycle life of the rechargeable lithium battery can be remarkably increased.

The method of preparing the carbonaceous material of the present invention is characterized in that the raw carbonaceous material is heat-treated under a fluorine atmosphere. The heat-treating is performed until functional groups on the surface of the carbonaceous material are removed by fluorine without fluorination (the generation of C—F covalent bond) occur on the surface. Accordingly, the method of the present invention can easily manufacture carbonaceous materials having good charge and discharge efficiency and discharge capacity.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing a carbon-based active material for a rechargeable lithium battery comprising the step of:

heat-treating a carbon-based material under a fluorine atmosphere at a temperature of more than about 100° C. and less than or equal to 150° C. such that free hydroxyl groups, whose presence would be indicated by a peak at an absorption wave n of about 3600 cm$^{-1}$, are removed from a surface thereof without the generation of C—F bonds whose presence would be indicated by a peak at an absorption wave number of about 1100 cm$^{-1}$.

2. The method of claim 1, wherein the heat-treating step comprises the sub-steps of injecting the carbon-based material into a reactor;

heat-treating the carbon-based material under vacuum;

charging gaseous fluorine into the reactor; and heat-treating the carbon-based material to remain in the reactor for 15 to 30 minutes.

* * * * *